(12) United States Patent
De Pretto

(10) Patent No.: US 10,065,703 B2
(45) Date of Patent: Sep. 4, 2018

(54) RIGHT CRANK ARM ASSEMBLY FOR A BICYCLE

(71) Applicant: Campagnolo S.r.l., Vicenza (IT)

(72) Inventor: Andrea De Pretto, Piovene Rocchette (IT)

(73) Assignee: CAMPAGNOLO S.R.L., Vicenza (IT)

( * ) Notice: Subject to any disclaimer, the term of this patent is extended or adjusted under 35 U.S.C. 154(b) by 250 days.

(21) Appl. No.: 13/789,933

(22) Filed: Mar. 8, 2013

(65) Prior Publication Data

US 2013/0233127 A1 Sep. 12, 2013

(30) Foreign Application Priority Data

Mar. 8, 2012 (IT) .............................. MI20120088 U

(51) Int. Cl.
*B62M 3/00* (2006.01)
*B62M 9/10* (2006.01)

(52) U.S. Cl.
CPC .............. *B62M 3/00* (2013.01); *B62M 9/105* (2013.01); *Y10T 74/2165* (2015.01)

(58) Field of Classification Search
CPC Y10T 74/2165; Y10T 74/2164; B62M 3/003; B62M 3/00; B62M 1/36; B62M 9/105; B62M 9/10; B62M 2701/0076; B62K 19/34; F16H 55/306; F16H 55/30; B62J 13/00; B62J 13/02
See application file for complete search history.

(56) References Cited

U.S. PATENT DOCUMENTS

| | | | | |
|---|---|---|---|---|
| 4,009,621 A | * | 3/1977 | Segawa | 74/594.2 |
| 4,332,574 A | * | 6/1982 | Aoyama et al. | 474/161 |
| 4,798,565 A | * | 1/1989 | Boyd | 474/158 |
| 4,838,122 A | * | 6/1989 | Takamiya | B62M 11/18 192/47 |
| 5,035,678 A | * | 7/1991 | Hageman | 74/594.1 |
| 5,464,373 A | * | 11/1995 | Leng | 474/140 |
| 5,609,536 A | * | 3/1997 | Hsu | 474/160 |
| 6,202,506 B1 | * | 3/2001 | Storck et al. | 74/594.1 |
| 6,860,171 B1 | * | 3/2005 | Nanko | B62M 3/003 474/160 |
| 2002/0028719 A1 | * | 3/2002 | Yamanaka | B62J 13/00 474/160 |
| 2006/0258498 A1 | * | 11/2006 | Tabe et al. | 474/160 |
| 2007/0129193 A1 | * | 6/2007 | Nonoshita et al. | 474/160 |
| 2008/0312016 A1 | * | 12/2008 | Chiang | B62M 9/105 474/116 |
| 2010/0317479 A1 | * | 12/2010 | Delale | B62M 3/003 475/213 |
| 2012/0135830 A1 | * | 5/2012 | Burke | 474/94 |
| 2013/0087012 A1 | * | 4/2013 | Sugimoto et al. | 74/594.2 |

* cited by examiner

*Primary Examiner* — Daniel D Yabut
(74) *Attorney, Agent, or Firm* — Volpe and Koenig, P.C.

(57) ABSTRACT

A right crank arm assembly for a bicycle has a right crank arm and at least one toothed crown that is coupled to the right crank arm. At least one damping element is arranged between the right crank arm and the toothed crown to be in abutment against respective faces of the right crank arm and the toothed crown.

9 Claims, 4 Drawing Sheets

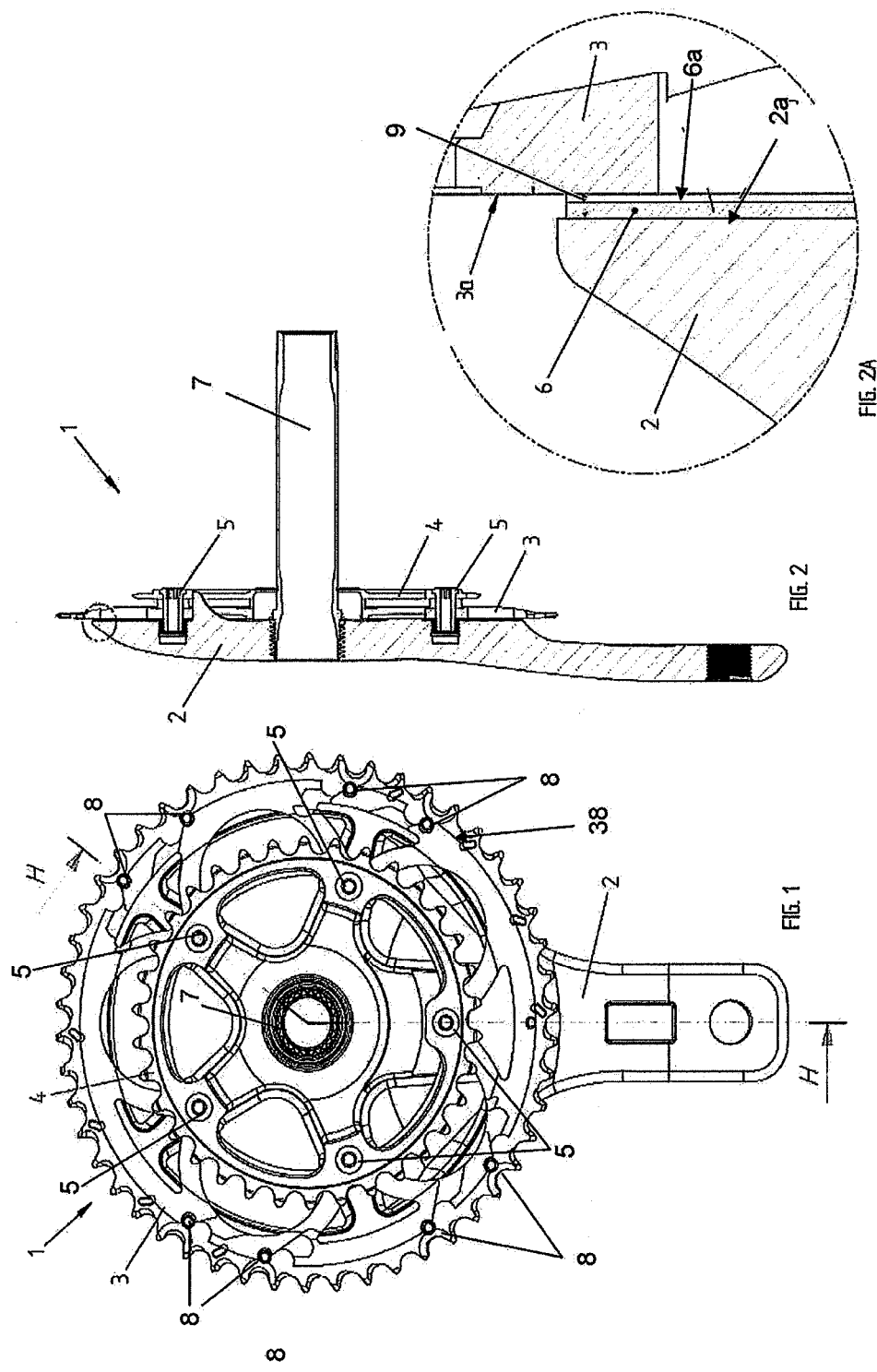

RIGHT CRANK ARM ASSEMBLY FOR A BICYCLE

CROSS REFERENCE TO RELATED APPLICATION

This application claims priority from Italian Patent Application MI2012U000088, filed on Mar. 8, 2012.

FIELD OF INVENTION

The present invention relates generally to a right crank arm assembly for a bicycle. More specifically, the invention relates to a right crank arm assembly for a racing bicycle.

BACKGROUND

Typically, in the field of bicycles, the expression "right crank arm assembly" is used to indicate an assembly comprising a right crank arm and at least one toothed crown, or gear, coupled to the right crank arm. The toothed crown, in particular, is the toothed wheel configured to pull the chain of the bicycle for motion transmission to the rear wheel of the bicycle, such motion being imparted by the cyclist through pedaling.

Nowadays there is frequent use of right crank arm assemblies that comprise more than one toothed crown. In the field of racing bicycles there are typically two toothed crowns and they have different diameters.

In conventional bicycles, the right crank arm is directly coupled to the toothed crown having the greater diameter at respective surfaces defined on respective front faces of such components. In particular, referring to the inner side of the crank arm and of the toothed crown as the side intended, during use, to face towards the frame of the bicycle and to the outer side as the side opposite the inner side and intended, in use, to face towards the outside, the coupling between right crank arm and toothed crown having the greater diameter typically takes place at the inner side of the crank arm and at the outer side of the toothed crown having the greater diameter.

The toothed crown having the greater diameter has a diameter that is considerably greater than the toothed crown having a smaller diameter. In order to facilitate gear shifting from the toothed crown having a smaller diameter to the one having a greater diameter it is common to provide the inner face of the toothed crown having the greater diameter with a plurality of axially projecting elements, hereafter also referred to as "pins."

The Applicant observed that the bicycle chain, in some operating conditions (especially in the so-called "maximum crossover" condition, i.e. when the chain engages the toothed crown having the smaller diameter—arranged axially closer to the frame of the bicycle—and at the rear wheel the sprocket having the smaller diameter—arranged axially farthest from the frame of the bicycle), touches the pins of the larger toothed crown and produces an annoying noise.

The Applicant also observed that such a noise is particularly accentuated in the case in which the right crank arm is made from composite material (for example carbon fibre) and is solid (i.e. without openings). In this case, the right crank arm behaves substantially like a "sound box", actually amplifying the aforementioned noise.

It is an object of the present invention to provide a right crank arm assembly for a bicycle that allows a drastic reduction of the aforementioned noise in operation.

SUMMARY

The invention provides a bicycle right crank arm assembly that has at least one toothed crown connected to the crank arm and at least one damping element that is arranged between the crank arm and the one toothed crown and in abutment against a face of the right crank arm and the one toothed crown.

BRIEF DESCRIPTION OF THE DRAWINGS

Further characteristics and advantages of the present invention will become clearer from the following detailed description made with reference to the attached drawings and given for indicative and not limitative purposes. In such drawings:

FIG. 1 schematically shows a frontal view of a first preferred embodiment of the right crank arm assembly for a bicycle according to the present invention, when mounted on a shaft of a bottom bracket assembly of the bicycle;

FIG. 2 schematically shows a longitudinal section view of the right crank arm assembly and of the shaft of FIG. 1, taken according to the two incident planes defined by lines H-H in FIG. 1;

FIG. 2A schematically shows an enlargement of a detail of the right crank arm assembly of FIG. 2, such a detail being defined by a dotted and dashed circumference;

DETAILED DESCRIPTION OF THE PREFERRED EMBODIMENTS

Introduction

Figure 3:
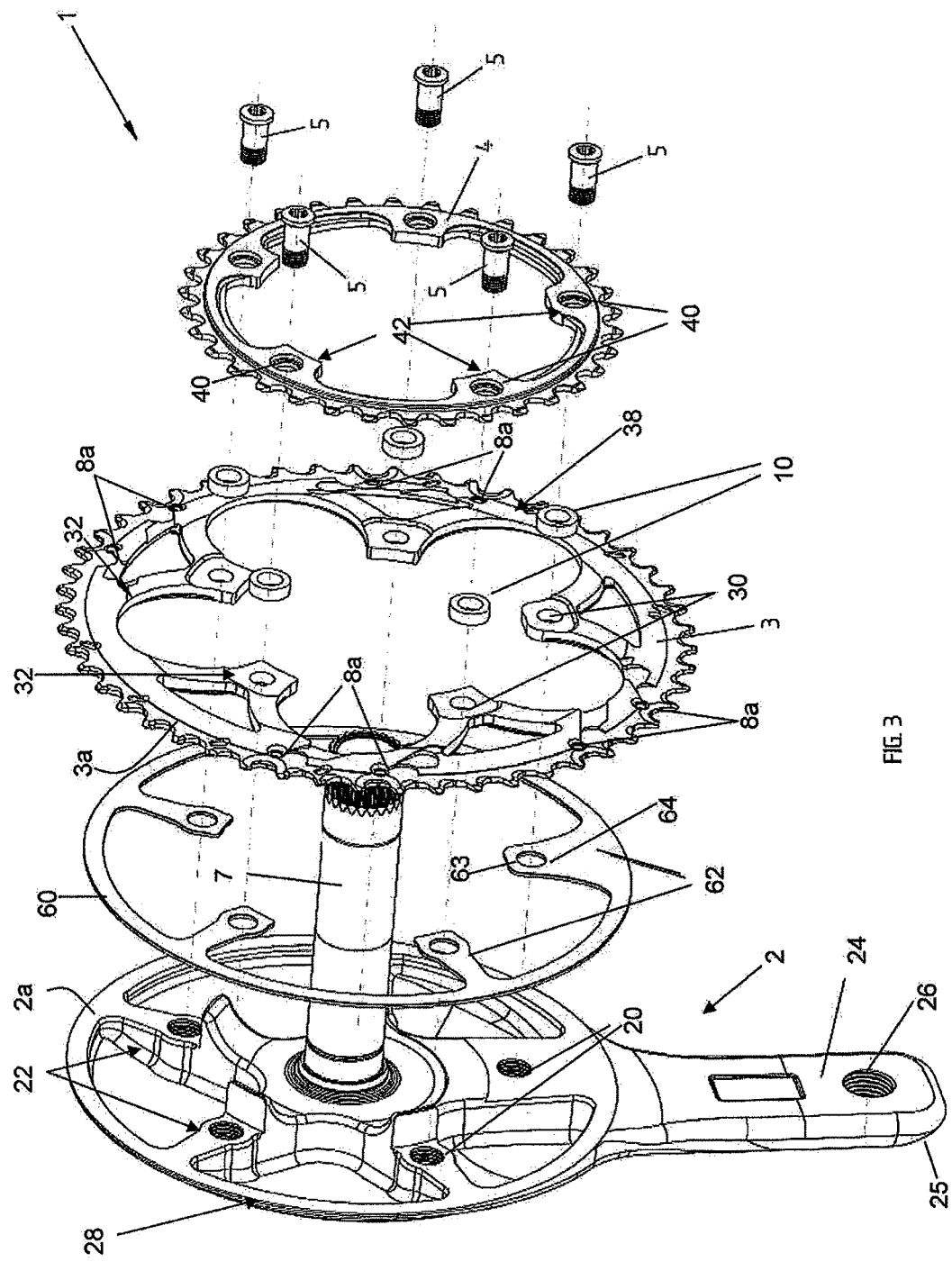
FIG. 3 schematically shows an exploded perspective view of a first preferred embodiment of the right crank arm assembly of FIG. 1.

The present invention therefore relates to a right crank arm assembly for a bicycle, comprising a right crank arm and at least one toothed crown coupled to said right crank arm, characterised in that the right crank arm assembly comprises at least one damping element arranged between said right crank arm and said at least one toothed crown and in abutment against respective faces of said right crank arm and said at least one toothed crown.

Advantageously, the use of the aforementioned damping element allows, in operation, a relative displacement in the axial direction between toothed crown and right crank arm, in this way attenuating the noise that is created by contact and friction at the interface between the aforementioned components.

In the preferred embodiments of the invention, the right crank arm assembly comprises a first toothed crown and a second toothed crown having a smaller diameter than that of said first toothed crown and coupled to at least said first toothed crown, wherein said at least one damping element is arranged between said right crank arm and said first toothed crown and wherein said first toothed crown comprises, on its face facing towards said second toothed crown, a plurality of axially projecting elements (pins) configured to facilitate the passage of the bicycle chain from the second toothed crown to the first toothed crown.

Advantageously, the damping element considerably reduces the transmission to the right crank arm of the impulses that are generated in operation due to the contact of the chain against the aforementioned elements (pins) of the toothed crown having the greater diameter. Consequently, the noise generated by the aforementioned impulses in the maximum crossover operating condition of the chain, which is relatively high, is drastically reduced.

The Applicant has found that such an advantageous reduction in noise is already appreciable and useful in the case of right crank arms with openings and/or made from metallic material, but it is particularly accentuated and effective in the preferred embodiments of the present invention in which the right crank arm is defined by a solid body made from composite material, for example carbon fibre.

In the preferred embodiments of the present invention, said at least one damping element is elastically deformable. Preferably, it is made from a material selected from the group consisting of: closed cell polyurethane foam, nitrile rubber, polypropylene, an elastomer.

The Applicant has found that the aforementioned materials are particularly effective in obtaining the advantageous effects described above, and they can be easily found at a low cost.

Preferably, the right crank arm assembly according to the present invention comprises a coating film made from plastic material associated with at least one of the opposite faces of said at least one damping element. More preferably, the coating film is made from polyvinyl chloride. Advantageously, the aforementioned coating film allows the damping element to be protected from dirt and wear.

Preferably, said coating film is arranged between said at least one damping element and said at least one toothed crown.

Preferably, said right crank arm comprises a plurality of first arms for coupling to said at least one toothed crown and said at least one toothed crown comprises a plurality of second arms for coupling to said first coupling arms.

In a first preferred embodiment of the right crank arm assembly of the present invention, said at least one damping element is defined by a single substantially annular shaped element. In this case, the mounting and maintenance operations of the right crank arm assembly are highly simplified.

In a second preferred embodiment of the right crank arm assembly of the present invention, said at least one damping element is defined by a single substantially annular shaped element comprising a plurality of third coupling arms, each of said third coupling arms being coupled to a respective first coupling arm and to a respective second coupling arm. Preferably, the first coupling arms, the corresponding second coupling arms and the third coupling arms are uniformly spaced in the circumferential direction.

In a further preferred embodiment of the right crank arm assembly of the present invention, said at least one damping element is defined by a plurality of damping plates, each damping plate being coupled to a respective first coupling arm and to a respective second coupling arm. Also in this case the first coupling arms and the corresponding second coupling arms are uniformly spaced in the circumferential direction, so that also the damping plates are uniformly spaced in the circumferential direction.

In preferred embodiments of the right crank arm assembly of the present invention, said at least one damping element comprises a plurality of holes for the passage of respective elements for fastening said at least one toothed crown to said right crank arm. Preferably, said holes are formed at the aforementioned plates or at the aforementioned third coupling arms. In this case the damping element, as well as being arranged between the right crank arm and the toothed crown, is also fixed thereto through the aforementioned fastening elements.

DETAILED DESCRIPTION

With reference to FIGS. 1, 2, 2A and 3, reference numeral 1 indicates a right crank arm assembly for a bicycle in accordance with a first embodiment of the present invention. For the sake of clarity of illustration, in cases in which in the drawings there are many elements to be identified with the same reference numeral, such a reference numeral will be placed only at some of such elements.

The right crank arm assembly 1 comprises a right crank arm 2 and two toothed crowns 3, 4 that are coupled to the right crank arm 2 through screws 5 or equivalent fastening elements. FIGS. 1-3 further show a shaft 7 of a bottom bracket assembly of the bicycle, on which the right crank arm 2 is mounted.

In the specific embodiment illustrated here the right crank arm 2 is defined by a solid body made from composite material, for example made from carbon fibre.

The right crank arm 2 can also be defined by a body with openings. In this case, the right crank arm 2 is in general made from metallic material, for example from light alloy or from composite material.

The right crank arm 2 has a star-shaped configuration and, in the specific embodiment illustrated here, it comprises five arms 22 for coupling to the toothed crown 3, one of which extends in a body 24 at the end 25 of which there is a threaded hole 26 for the passage of a bicycle pedal, not illustrated in the figures.

The five coupling arms 22 are equally spaced apart in the circumferential direction and are connected by a crown 28 for the abutment of the toothed crown 3.

The toothed crown 3 comprises five arms 32 for coupling to the coupling arms 22 of the right crank arm 2.

Similarly, the toothed crown 4 comprises five arms 42 for coupling to the coupling arms 32 of the toothed crown 3 and to the coupling arms 22 of the right crank arm 2.

The toothed crown 3 has a greater diameter than that of the toothed crown 4 and it is arranged between the right crank arm 2 and the toothed crown 4. The toothed crown 3 comprises, on its face facing towards the toothed crown 4, a plurality of axially projecting pins 8 configured to facilitate, in operation, the passage of the bicycle chain (not illustrated in the figures) from the toothed crown 4 to the toothed crown 3. It should be noted that the seats 8a in which the pins 8 are mounted are shown in FIG. 3, the pins being not illustrated. The aforementioned pins 8 are distributed in pairs in an equally spaced manner on a crown portion 38 of the toothed crown 3.

The screws 5 pass through holes 30 and 40 formed in the coupling arms 30 and 40 of the toothed crowns 3 and 4, respectively. The screws 5 are screwed into respective threaded holes 20 formed in the coupling arms 22 of the right crank arm 2.

In accordance with the present invention, a damping element 6 is arranged between the right crank arm 2 and the toothed crown 3. Such a damping element 6 is in abutment against respective faces 2a, 3a of the right crank arm 2 and of the toothed crown 3, respectively.

The damping element 6 is elastically deformable. For example, it can be made from closed cell polyurethane foam, nitrile rubber, polypropylene or an elastomer, such as nitrile butadiene rubber and chloroprene.

As shown in FIG. 2A, a coating film 9 made from plastic material is associated with the face 6a of the damping element 6 facing towards the toothed crown 3. The coating film 9 can for example be made from polyvinyl chloride.

For example, the overall thickness of the damping element 6 made from closed cell polyurethane foam and of the coating film 9 made from polyvinyl chloride can be comprised between 0.5 and 1 mm, the extremes being included.

The damping element 6 is defined by a single substantially annular shaped element, comprising a crown portion 60, the dimensions of which substantially correspond to those of the abutment crown 28 of the right crank arm 2.

The damping element 6 comprises a plurality of coupling arms 62 which extend radially towards the inside from the crown portion 60. Each coupling arm 62 is coupled to a respective coupling arm 22 of the right crank arm 2 and to a respective coupling arm 32 of the toothed crown 3.

As shown in FIG. 3, the coupling arm 62 corresponding to the coupling arm 22 from which the body 24 extends has, near to the crown portion 60, greater dimensions with respect to those of the other four coupling arms 62 along the circumferential direction. This is correlated to the fact that the coupling arm 22 of the right crank arm 2 from which the body 24 extends in general has a greater length than that of the other four coupling arms 22, in order to effectively withstand the stress imparted on the pedal by the cyclist.

At the radially inner ends 63 of the coupling arms 62 of the damping element 6 there are respective holes 64 for the passage of the screws 5 for fixing the toothed crowns 3, 4 to the right crank arm 2.

As shown in FIG. 3, between the two toothed crowns 3 and 4 there are spacers in the form of five washers 10. The five screws 5 pass through the washers 10.

Figure 4:
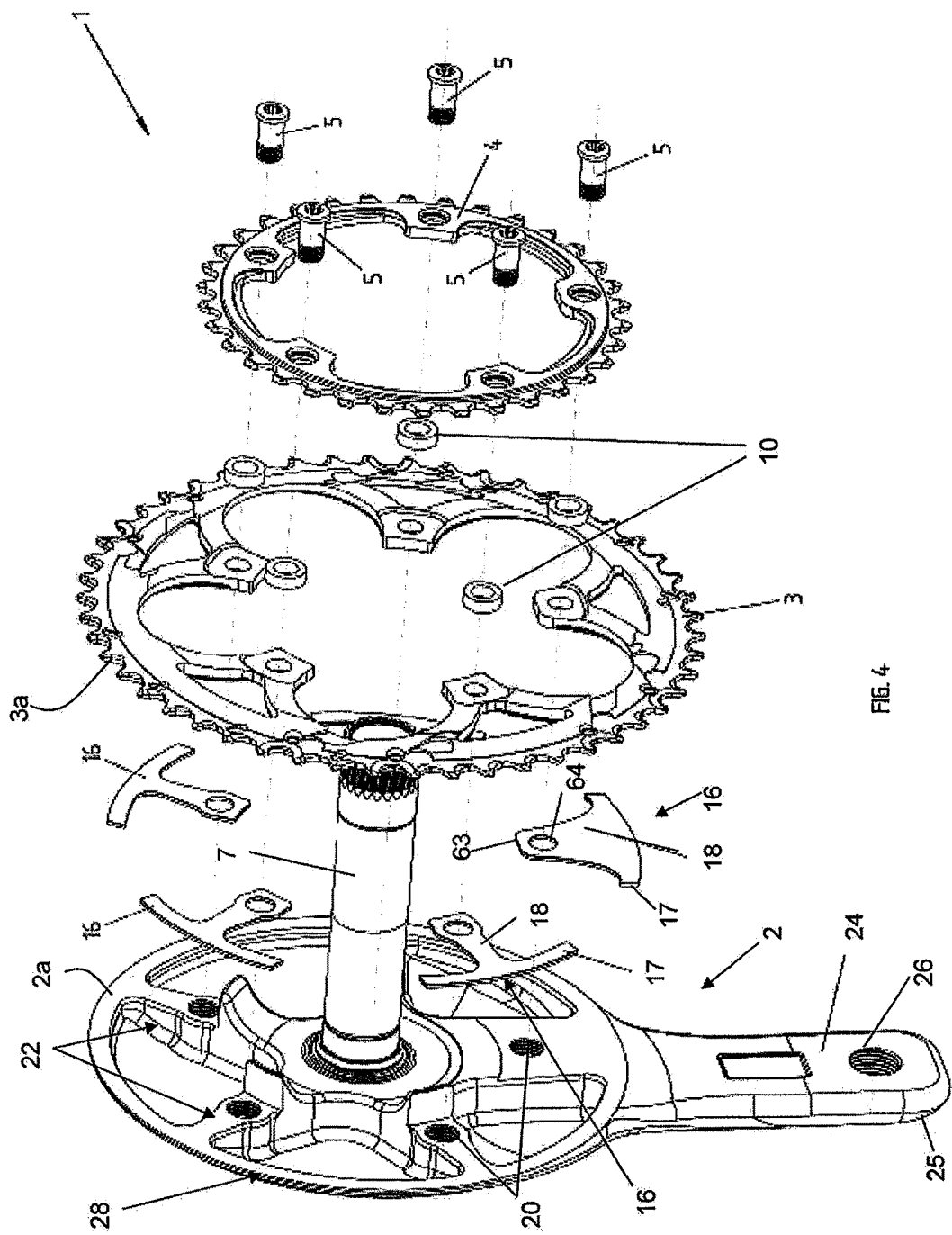
FIGS. 4 and 5 schematically show respective exploded perspective views of further preferred embodiments of the right crank arm assembly of the present invention.

FIG. 4 shows a second embodiment of a right crank arm assembly according to the present invention, which is wholly indicated again with 1.

In FIG. 4, structural elements that are identical—or equivalent from the functional point of view—to those of the assembly 1 described above with reference to FIGS. 1, 2, 2A and 3, will be given the same reference numerals and they will not be described further.

In particular, the assembly 1 of FIG. 4 differs from the assembly 1 of FIGS. 1, 2, 2A and 3 in that the damping element 6 is now defined by five damping plates 16, each damping plate 16 being coupled to the respective coupling arms 22 and 32, respectively, of the right crank arm 2 and of the toothed crown 3.

The shape of each of the damping plates 16 is generically like a T and substantially corresponds to the shape of a corresponding portion of the right crank arm 2.

In particular, each damping plate 16 comprises an arc-shaped portion 17, whose dimensions are substantially analogous to those of a respective part of the abutment crown 28 of the right crank arm 2, and a radial portion 18, which extends towards the inside from the arc-shaped portion 17. Each radial portion 18 is coupled to a respective coupling arm 22 of the right crank arm 2 and to a respective coupling arm 32 of the toothed crown 3.

Comparing FIGS. 3 and 4 it can be seen that the shape of the damping plates 16 of FIG. 4 substantially corresponds to the shape of the portions of the damping element 6 of FIG. 3 at which there are the coupling arms 62.

At the radially inner ends 63 of the radial portions 18 of the damping plates 16 there are respective holes 64 for the passage of the screws 5 for fixing the toothed crowns 3, 4 to the right crank arm 2.

As to the material and dimensions of the damping plates 16, what has been described above with reference to the damping element 6 applies here.

Also in this case, respective coating films made from plastic material (for example polyvinyl chloride) can be associated with one or both of the opposite faces of the damping plates 16. Preferably, the aforementioned coating films are associated with the faces of the plates 16 facing towards the toothed crown 3.

Figure 5:
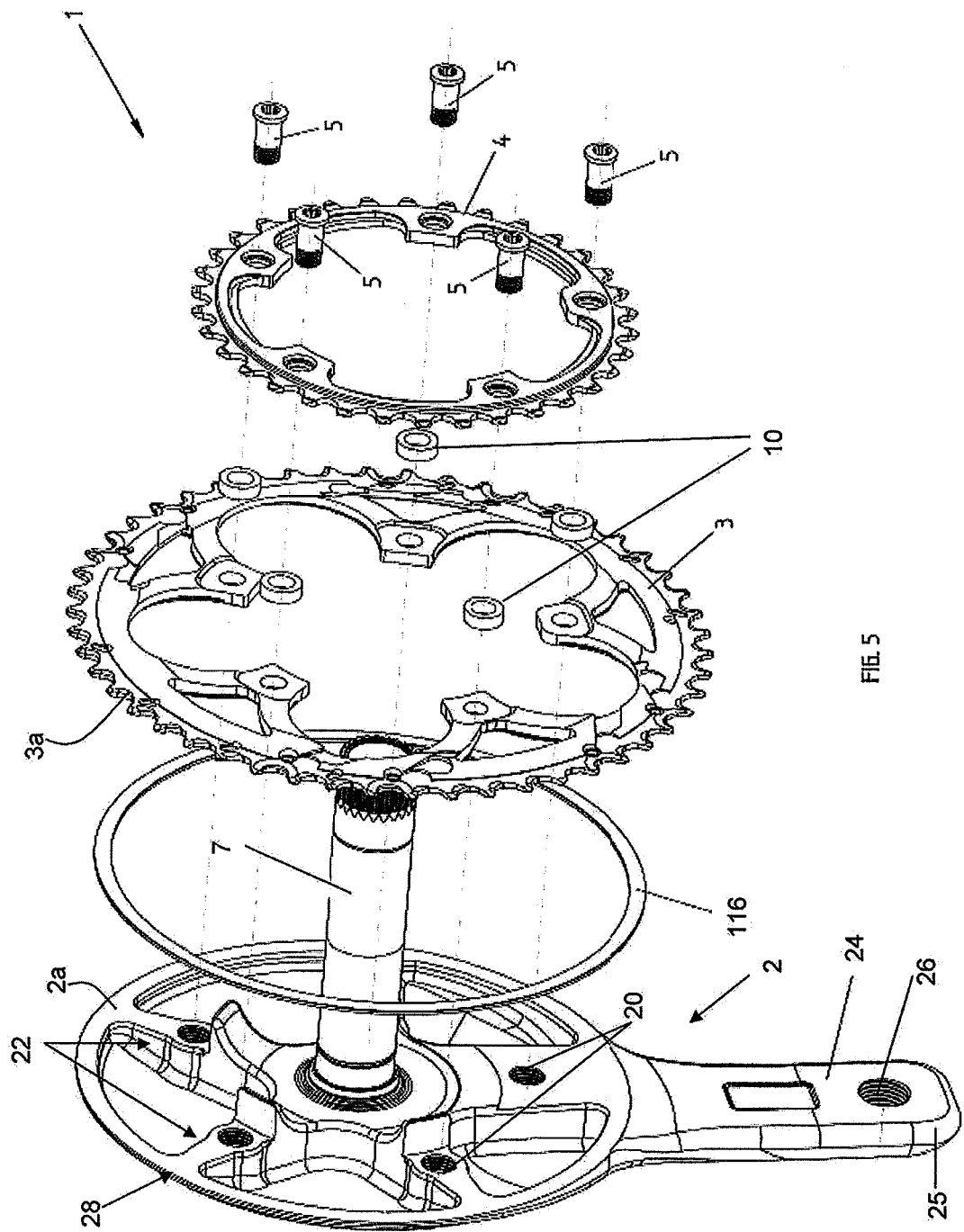

FIG. 5 shows a further embodiment of a right crank arm assembly according to the present invention, which is wholly indicated again with 1.

In FIG. 5, structural elements that are identical—or equivalent from the functional point of view—to those of the assembly 1 described above with reference to FIGS. 1, 2, 2A and 3, will be given the same reference numerals and they will not be described further.

In particular, the assembly 1 of FIG. 5 differs from the assembly 1 of FIGS. 1, 2, 2A and 3 in that the damping element 6 of FIGS. 1, 2, 2A and 3 is replaced by a damping element 116 of a different shape.

In particular, the damping element 116 is defined by a single annular shaped element, the dimensions of which substantially correspond to those of the abutment crown 28 of the right crank arm 2.

As can be seen by comparing FIGS. 3 and 5, the damping element 116 substantially corresponds to just the crown portion 60 of the damping element 6. The damping element 116 is therefore simply arranged between the crown 28 of the right crank arm 2 and the crown portion 3a of the toothed crown 3.

Also in this case, the coating film 9 is applied on the damping element 116, in a totally analogous way to what has been described above with reference to the damping element 6. Similarly, as to the material and dimensions of the damping element 116, what has been described above with reference to the damping element 6 applies here.

Of course, a man skilled in the art can bring numerous changes and variants to the right crank arm assembly for a bicycle described above, in order to satisfy specific and contingent requirements, all of which are in any case within the scope of protection of the present invention as defined by the following claims.

What is claimed is:

1. A right crank arm assembly for a bicycle comprising;
   a right crank arm having a plurality of arms that each include a fastener position having a defined radius;
   a first toothed crown and a second toothed crown coupled to said right crank arm at the fastener positions, said second toothed crown having a smaller diameter than that of said first toothed crown and coupled to at least said first toothed crown, and a face of said first toothed crown facing towards said second toothed crown has a plurality of axially protruding elements configured to facilitate the passage of the bicycle chain from the second toothed crown to the first toothed crown; and
   at least one damping element that contacts an axial end face of said right crank arm and said first toothed crown, and the at least one damping element is positioned entirely radially outwardly with respect to each fastener position.

2. The right crank arm assembly according to claim 1 wherein said right crank arm is comprised of a composite material including carbon fibre.

3. A right crank arm assembly for a bicycle, comprising:
   a right crank arm having a plurality of arms that each include a fastener position having a defined radius;

at least one toothed crown coupled to said right crank arm at the fastener positions; and at least one damping element has opposed axial end faces and a substantially uniform thickness between the opposed axial end faces, the at least one damping element is arranged between and is in contact with respective axial faces of said right crank arm and said at least one toothed crown, and the at least one damping element is positioned entirely radially outwardly with respect to each fastener position.

4. The right crank arm assembly according to claim 3, wherein said at least one damping element is made from a material selected from the group consisting of: closed cell polyurethane foam, nitrile rubber, polypropylene, and an elastomer.

5. The right crank arm assembly according to claim 3, wherein said at least one damping element is elastically deformable and is made from a material selected from the group consisting of: closed cell polyurethane foam, nitrile rubber, polypropylene, and an elastomer.

6. The right crank arm assembly according to claim 3 further comprising a coating film made from plastic material, the coating film being associated with at least one face of said at least one damping element.

7. The right crank arm assembly according to claim 6 wherein said coating film is arranged between said at least one damping element and said at least one toothed crown.

8. The right crank arm assembly according to claim 3 wherein said at least one damping element is a single element having a substantially annular shape.

9. The right crank arm assembly according to claim 3 wherein said right crank arm is comprised of a composite material including carbon fibre.

* * * * *